United States Patent
Hong

(10) Patent No.: US 7,561,201 B2
(45) Date of Patent: Jul. 14, 2009

(54) METHOD FOR OPERATING A DIGITAL PHOTOGRAPHING APPARATUS USING A TOUCH SCREEN AND A DIGITAL PHOTOGRAPHING APPARATUS USING THE METHOD

(75) Inventor: Soon-hac Hong, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 711 days.

(21) Appl. No.: 11/035,371

(22) Filed: Jan. 12, 2005

(65) Prior Publication Data

US 2006/0072028 A1    Apr. 6, 2006

(30) Foreign Application Priority Data

Oct. 1, 2004    (KR) ...................... 10-2004-0078260

(51) Int. Cl.
*H04N 5/222* (2006.01)
(52) U.S. Cl. .............................. 348/333.01; 348/333.02
(58) Field of Classification Search ............ 348/333.01, 348/333.02, 333.03, 333.04, 333.05
See application file for complete search history.

(56) References Cited

U.S. PATENT DOCUMENTS

| | | | |
|---|---|---|---|
| 5,649,244 A * | 7/1997 | Sato et al. .................... | 396/287 |
| 5,923,908 A * | 7/1999 | Schrock et al. ............... | 396/85 |
| 6,021,280 A * | 2/2000 | Osato et al. .................. | 396/287 |
| D478,109 S * | 8/2003 | Tanaka ....................... | D16/219 |
| 7,019,778 B1 * | 3/2006 | Prabhu et al. .......... | 348/333.01 |
| 7,110,032 B2 * | 9/2006 | Furukawa ............... | 348/333.02 |
| 2002/0031345 A1 * | 3/2002 | Miyamoto ................... | 396/287 |
| 2002/0054233 A1 * | 5/2002 | Juen .......................... | 348/372 |
| 2003/0081135 A1 * | 5/2003 | Boll ...................... | 348/333.01 |
| 2003/0112354 A1 * | 6/2003 | Ortiz et al. ............. | 348/333.01 |
| 2004/0021684 A1 * | 2/2004 | B. Millner .................. | 345/719 |
| 2004/0141082 A1 * | 7/2004 | Nakahira ............... | 348/333.01 |
| 2004/0189856 A1 * | 9/2004 | Tanaka ....................... | 348/345 |

\* cited by examiner

*Primary Examiner*—Tuan V Ho
*Assistant Examiner*—Kent Wang
(74) *Attorney, Agent, or Firm*—Drinker Biddle & Reath LLP

(57) ABSTRACT

A method for operating a digital photographing apparatus having a touch screen is provided. The method includes: detecting if a menu button for changing shooting information of a digital photographing apparatus has been pressed by a user; displaying icons on a display panel to illustrate which operating modes are currently set; detecting when a user has touched one of the displayed icons and, in response thereto, displaying menu icons that correspond to the touched icon; and, if a menu icon that is desired to be changed is touched among the displayed menu icons, performing a relevant function to change shooting information. According to the above method, shooting information of the camera can be simply changed by operating only the icons displayed on the touch screen. Thus, a unique camera operating method is provided whereby a user can easily and conveniently change and operate shooting information and images.

16 Claims, 15 Drawing Sheets

METHOD FOR OPERATING A DIGITAL PHOTOGRAPHING APPARATUS USING A TOUCH SCREEN AND A DIGITAL PHOTOGRAPHING APPARATUS USING THE METHOD

BACKGROUND OF THE INVENTION

This application claims the priority of Korean Patent Application No. 2004-78260, filed on Oct. 1, 2004, in the Korean Intellectual Property Office, the disclosure of which is incorporated herein in its entirety by reference.

1. Field of the Invention

The present invention relates to a method for operating a digital photographing apparatus such as a digital camera, and more particularly, to a method for operating digital photographing apparatus using a touch screen. The present invention also relates to a digital photographing apparatus using the method.

2. Description of the Related Art

U.S. Pat. No. 5,923,908 discloses a digital camera mounting a touch screen and displaying a simple menu on the touch screen. In the disclosed digital camera, only the options on a simple menu that has been preset by existing buttons may be changed using the touch screen. Accordingly, to elaborately operate a camera function mode or an image display mode, a menu button and other buttons should be inevitably used. This causes inconvenience to the user.

SUMMARY OF THE INVENTION

Various embodiments of the present invention provide a method for changing shooting information of a digital photographing apparatus such as a digital camera in a simple manner by operating only icons displayed on a touch screen. An embodiment of the present invention also provides a unique method for operating a camera on a touch screen of a digital camera.

According to an embodiment of the present invention, there is provided a method for operating a digital camera using a touch screen. The method includes: if a predetermined button for changing shooting information of the digital camera is pressed, displaying shooting information icons currently set on a display panel; if an icon that is desired to be changed is touched among the displayed icons, displaying menu icons that correspond to the touched icon; and if a menu icon that is desired to be changed is touched among the displayed menu icons, performing a relevant function to change shooting information.

According to another embodiment of the present invention, there is provided a method for operating a digital camera using a touch screen, wherein the method includes: (a) if a predetermined button for displaying images stored in the digital camera is pressed, displaying on a display panel the next image, moving image, or audio file in the reverse direction; and (b) if a predetermined input is touched on the display panel on which the image, the moving image, or the audio file photographed last is displayed, performing a relevant function to operate the image, the moving image, or the audio file.

According to an embodiment of the present invention, if a region from the center to the left on the display panel of the operation (b) is touched or a reverse symbol such as "←" is drawn on the region, a previous image, moving image, or audio file is displayed.

According to an embodiment of the present invention, if a region from the center to the top of the display panel of the operation (b) is touched or an uploading signal such as "↑" is drawn on the region, a current image, a moving image, or an audio file is uploaded to a personal computer (PC) or other camera.

According to an embodiment of the present invention, if a region from the center to the right on the display panel of the operation (b) is touched or a forward signal such as "→" is drawn on the region, the next image, moving image, or audio file is displayed.

According to an embodiment of the present invention, if a region from the center to the bottom of the display panel of the operation (b) is touched or a deletion signal such as "↓" is drawn, a current image, moving image, or audio file is deleted.

According to an embodiment of the present invention, if an enlargement symbol such as ⌂ is drawn on the display panel of the operation (b), a current image is zoomed-in (enlarged).

According to an embodiment of the present invention, if a fast-forward symbol such as ▸▸ is drawn on the display panel of the operation (b), a moving image or an audio file stored last in the camera is fast-forwarded.

According to an embodiment of the present invention, if a rewind symbol such as ◂◂ is drawn on the display panel of the operation (b), a moving image or an audio file stored last in the camera is rewound.

According to an embodiment of the present invention, if a rotation symbol such as ↻ is drawn on the display panel of the operation (b), a current image is rotated.

According to an embodiment of the present invention, if a thumbnail display symbol such as ⊞ is drawn on the display panel of the operation (b), a thumbnail screen where a plurality of images are simultaneously displayed on the display panel is displayed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Various embodiments of the present invention will now be described more fully with reference to the accompanying drawings, in which exemplary embodiments of the invention are shown.

Figure 1:
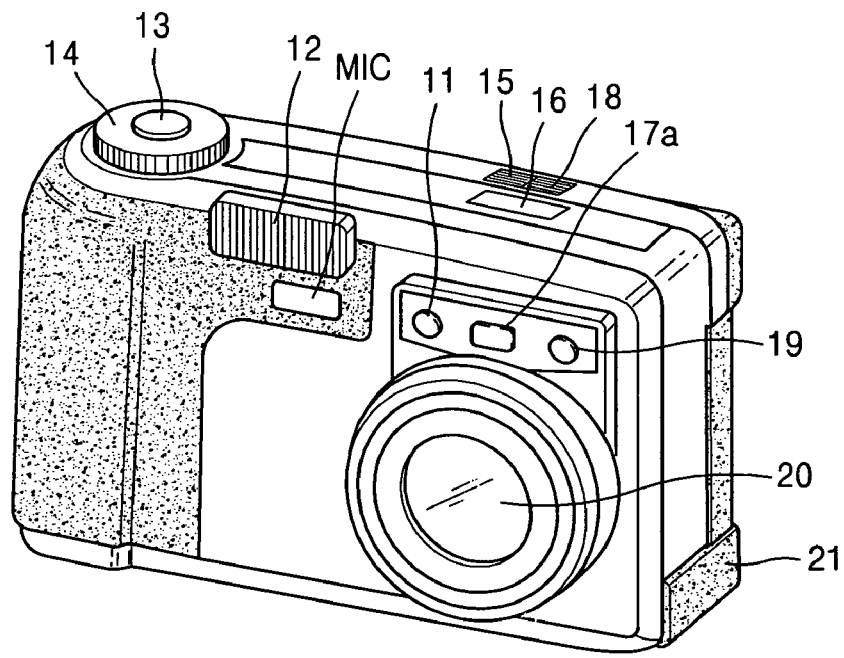
FIG. 1 is a perspective view of a front appearance of a digital camera.

FIG. 1 is a perspective view of a front appearance of a general digital camera.

Referring to FIG. 1, a general digital camera has, on its front side, a microphone (MIC), a self-timer lamp 11, a flash 12, a shutter button 13, a mode dial 14, a function-selection button 15, a shooting information display unit 16, a viewfinder 17a, a function-block button 18, a flash-light amount sensor 19 (FS), a lens unit 20, and an external interface unit 21.

When the camera is in a self-timer mode, the self-timer lamp 11 operates for a set time from a time point at which the shutter button 13 is pressed to a time point at which the shutter operates. The user uses the mode dial 14 and the function-selection button 15 to select and set a variety of modes such as a still image mode, a night scene mode, a moving image mode, a playback mode, a computer connection mode, and a system setting mode. The shooting information display unit 16 displays information of respective function related to shooting. For example, the digital camera operation modes selected via a manipulation of the function-selection button 15 may be displayed on the shooting information display unit 16. The function-block button 18 is used in selecting a respective function displayed on the shooting information display unit 16.

Figure 2:
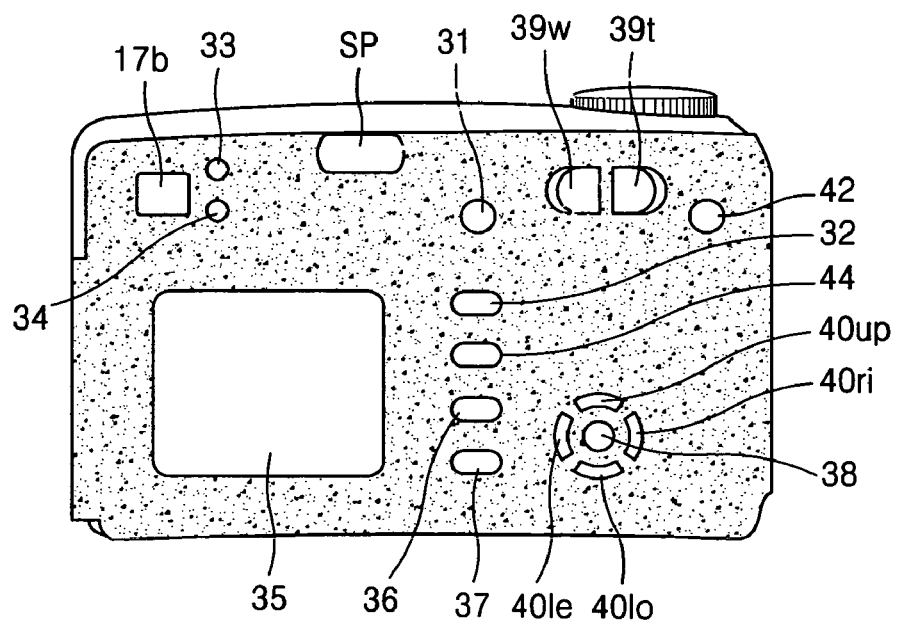
FIG. 2 is a rear view of the digital camera of FIG. 1 mounting a touch screen.

FIG. 2 is a rear view of the digital camera of FIG. 1.

Referring to FIG. 2, a general digital camera has, on its backside, a representative-voice button 42, a speaker SP, a power button 31, a monitor button 32, an auto-focus lamp 33, a viewfinder 17b, a flash stand-by lamp 34, a display panel 35 comprising a touch screen, an exposure correction/deletion button 36, an enter/playback button 37, a menu/OK button 38, a wide angle-zoom button 39w, a telephoto-zoom button 39t, an upward-movement button 40up, a right-movement button 40ri, a downward-movement button 40lo, a left-movement button 40le, and a playback button 44.

If a user presses the representative-voice button 42, a representative-voice request signal requesting generation of a new directory and a corresponding representative-voice file are generated.

The monitor button 32 is used to select a display mode of the display panel 35. For example, if a user presses the monitor button 32 a first time, an image of an object and shooting information thereof are displayed on the display panel 35. If a user presses the monitor button 32 a second time, only the image of the object is displayed on the display panel 35. Pressing the monitor button 32 a third time cuts off the power supply to the display panel 35.

The auto-focus lamp 33 operates when an auto-focusing operation is completed.

The flash stand-by lamp 34 operates when the flash 12 (see FIG. 1) is in a stand-by state.

When the digital camera is operated manually, the exposure correction/deletion button 36 is used to adjust a light amount, The exposure correction/deletion button 36 is used as a deletion button during an operation of setting a respective mode.

The enter/playback button 37 is used by the digital camera user to input data when a photographed still image or photographed moving image is to be edited. When the camera is operating in a playback mode, the enter/playback 37 button is used for a stop function or a playback function.

The menu/OK button 38 is used in displaying and selecting a menu associated with a mode selected from the mode dial 14.

Pressing the upward-movement button 40up, the right-movement button 40ri, the downward-movement button 40lo, and the left-movement button 40le sets an up mode, right mode, down mode, and left mode, respectively.

The playback mode button 44 is used to review the most recently recorded image, moving image, or voice information.

Figure 3:
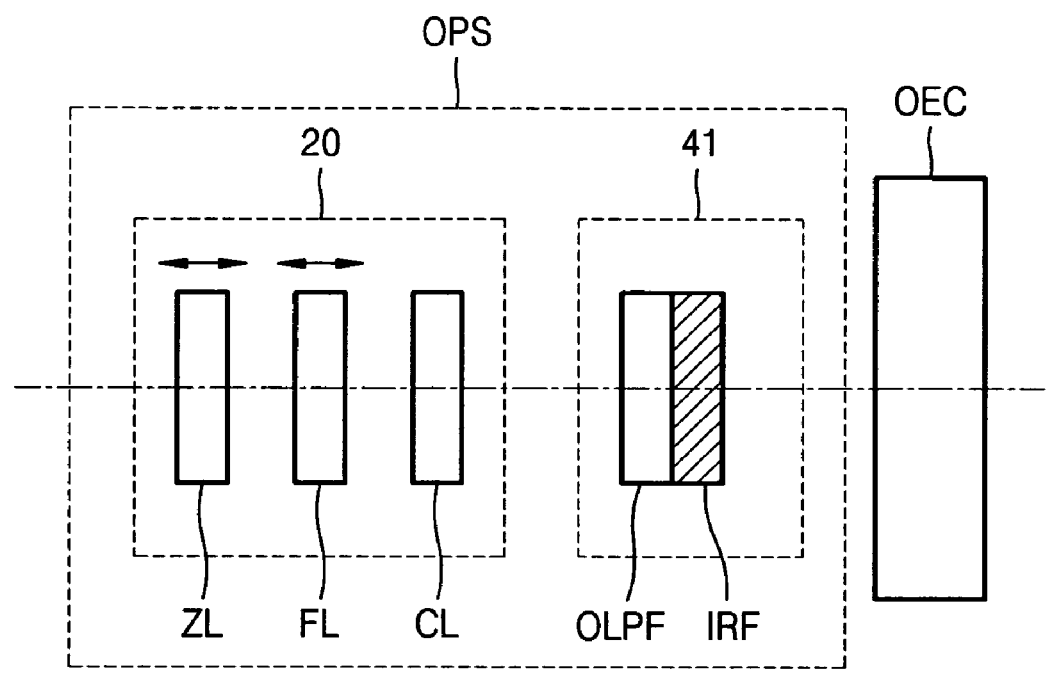
FIG. 3 is a view illustrating a structure in an incident side of the digital camera of FIG. 1.
Figure 4:
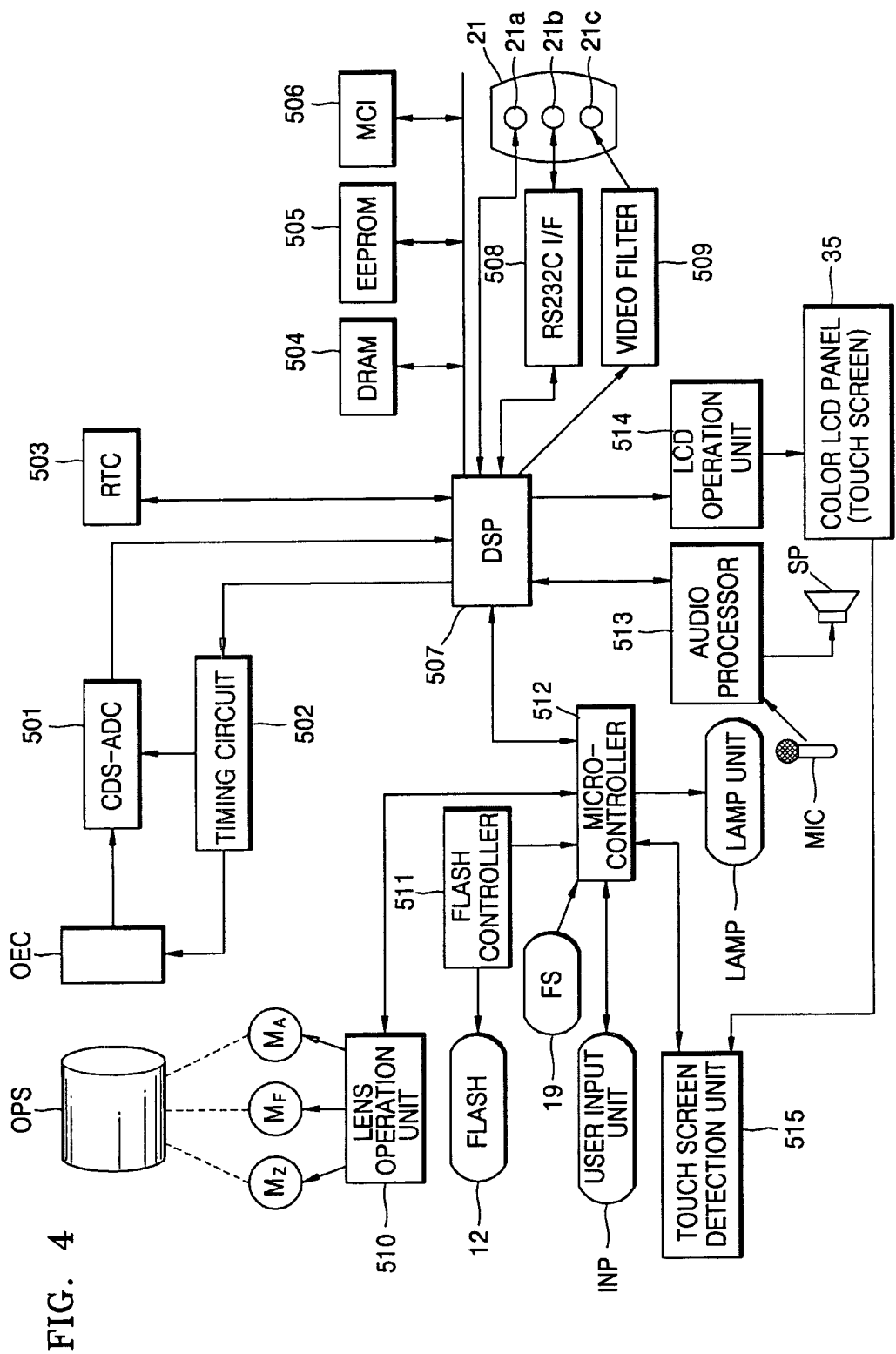
FIG. 4 is a block diagram illustrating the configuration of the digital camera of FIG. 1.

FIG. 3 is a view illustrating a structure in an incident side of the digital camera of FIG. 1. FIG. 4 is a block diagram illustrating the construction of a digital camera mounting a touch screen, as shown in FIGS. 1-2. The construction of the digital camera will be described in the following with reference to FIGS. 1-4.

An optical system (OPS) including a lens unit 20 and a filter unit 41 optically processes light from an object. The lens unit 20 of the optical system includes a zoom lens (ZL), a focus lens (FL), and a compensation lens (CL).

If a user presses the wide angle-zoom button 39w (see FIG. 2) or the telephoto-zoom button 39t (see FIG. 2) included in a user input unit (INP), a corresponding signal is inputted to a micro-controller 512. Accordingly, the micro-controller 512 controls the lens operation unit 510 so that a zoom motor (MZ) is operated and the zoom lens (ZL) is moved. That is, if the wide angle-zoom button 39w is pressed, a focal length of the zoom lens (ZL) is shortened so that an angle of view is widened, and if the telephoto-zoom button 39t is pressed, a focal length of the zoom lens (ZL) is lengthened so that an angle of view becomes narrow.

The micro-controller 512 can compute a viewing angle θ at a zoom lens (ZL) position from design data of the optical system on the basis of the above-described characteristics. Here, since a focus lens (FL) position is adjusted with the zoom lens (ZL) position set, the viewing angle θ is not significantly influenced by the focus lens (FL) position. The compensation lens (CL) compensates for a refraction index on the whole and is not operated separately.

A reference numeral MA represents an aperture operating motor (not shown). Here, a rotational angle of the aperture operating motor MA is changed depending on whether a mode is a designated exposure mode or not. The designated exposure mode means a mode such that if part of a region desired by a user in a region to be shot coincides with a designated detection region displayed on the display panel 35 of the digital camera, the light exposure amount of the digital camera is set for an average brightness of the designated detection region.

In the filter unit 41 of the optical system, the optical low pass filter (OLPF) eliminates an optical noise including a high frequency component. An infra-red cut filter (IRF) cuts off an infrared component of incident light.

An optical-electric converter (OEC) of a charge coupled device (CCD) or a complementary metal-oxide-semiconductor (CMOS) converts light from the optical system (OPS) into an electric analog signal. Here, a digital signal processor (DSP) 507 controls operations of the OEC and an analog-digital converter (ADC) 501 by controlling a timing circuit 502. A correlation double sampler and analog-to-digital converter (CDS-ADC) element 501 as an analog-digital converter processes an analog signal from the OEC, removes its high frequency component noise, adjusts its amplitude, and converts the signal into a digital signal. The DSP 507 processes a digital signal from the CDS-ADC element 501 to generate a digital video signal classified into a brightness signal and a chrominance signal.

The lamp unit (LAMP) operated by the micro-controller 512 includes the self-timer lamp 11, the auto-focus lamp 33, and the flash stand-by lamp 34. The user input unit INP includes: the shutter button 13; the mode dial 14; the function-selection button 15; the function-block button 18; the monitor button 32; the exposure correction/deletion button 36; the enter/playback button 37; the menu button 38; the wide angle-zoom button 39w; the telephoto-zoom button 39t; the upward-movement button 40up; the right-movement button 40ri; the downward-movement button 40lo; and the left-movement button 40le.

A digital video signal from the DSP 507 is temporarily stored in a dynamic random access memory (DRAM) 504. A program and set data necessary for operation of the DSP 507 are stored in electrically erasable programmable read-only memory (EEPROM) 505. Particularly, a program for camera operation using the touch screen according to an embodiment of the present invention is stored in the EEPROM 505, so that a relevant function is performed if predetermined touch screen data is input. A user memory card is attached/detached to and from a memory card interface (MCI) 506.

A digital video signal from the DSP 507 is input to a liquid crystal display (LCD) operation unit 514 so that an image is displayed on the display unit, e.g. a color LCD panel 35.

A digital video signal from the DSP 507 can also be transmitted through a serial communication using a universal serial bus (USB) connection unit 21a, through an RS232C interface 508 and an RS232C connection unit 21b, and as a video signal through a video filter 509 and a video output unit 21c.

An audio processor 513 relays a voice signal from a microphone (MIC) into the DSP 507 or a speaker (SP). The audio processor 513 also outputs an audio signal from the DSP 507 to the speaker (SP). In the meantime, the micro-controller 512 operates the flash 12 by controlling the operation of a flash controller 511 according to a signal from the flash-light amount sensor (FS) 19.

If power is supplied to the digital camera and the menu/OK button 38 is pressed, the menu, i.e., shooting information setting icons, is displayed on the color LCD panel 35 (hereinafter, referred to as a touch screen) consisting of the touch screen. If a user selects an icon to change among the displayed icons, a touch screen detection unit 515 detects the selection of a user and outputs the same to the micro-controller 512. The micro-controller 512 controls so that a relevant icon's function may be performed using a program stored in the EEPROM 505. A more detailed description of these operations will be made below with reference to FIGS. 5, 6, and 7A through 7J.

In addition, if the playback mode button 44 is pressed while power is supplied to the digital camera, an image photographed last is displayed on the touch screen 35. If a user inputs a predetermined drawing on the touch screen, the touch screen detection unit 515 detects the predetermined drawing of a user and outputs the detected drawing to the micro-controller 512. The micro-controller 512 controls so that a function that corresponds to the predetermined drawing input by a user may then be performed using a program stored in the EEPROM 505. A more detailed description of these operations will be made below with reference to FIGS. 8 and 9A through 9F.

Figure 5:
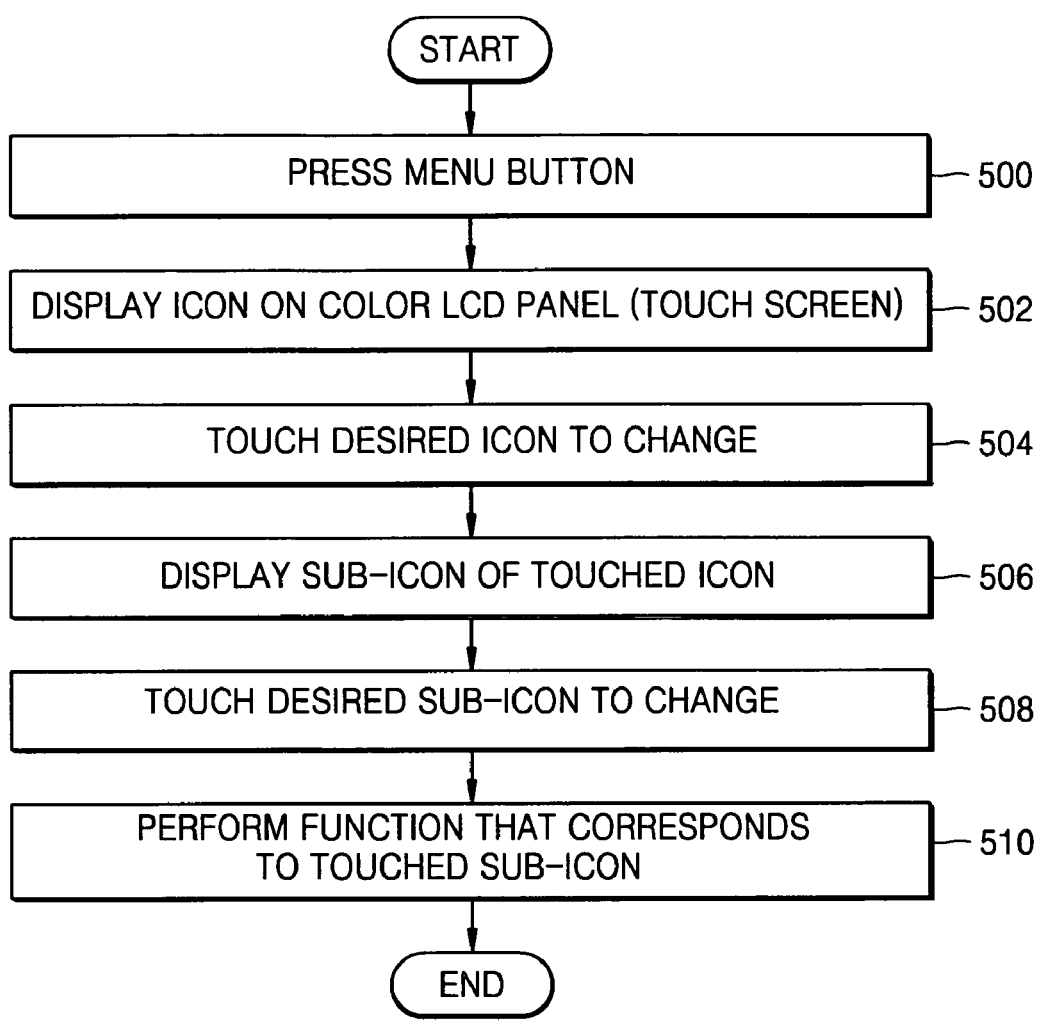
FIG. 5 is a flowchart illustrating operations of a method for operating a digital camera using a touch screen according to a first embodiment of the present invention.
Figure 6:
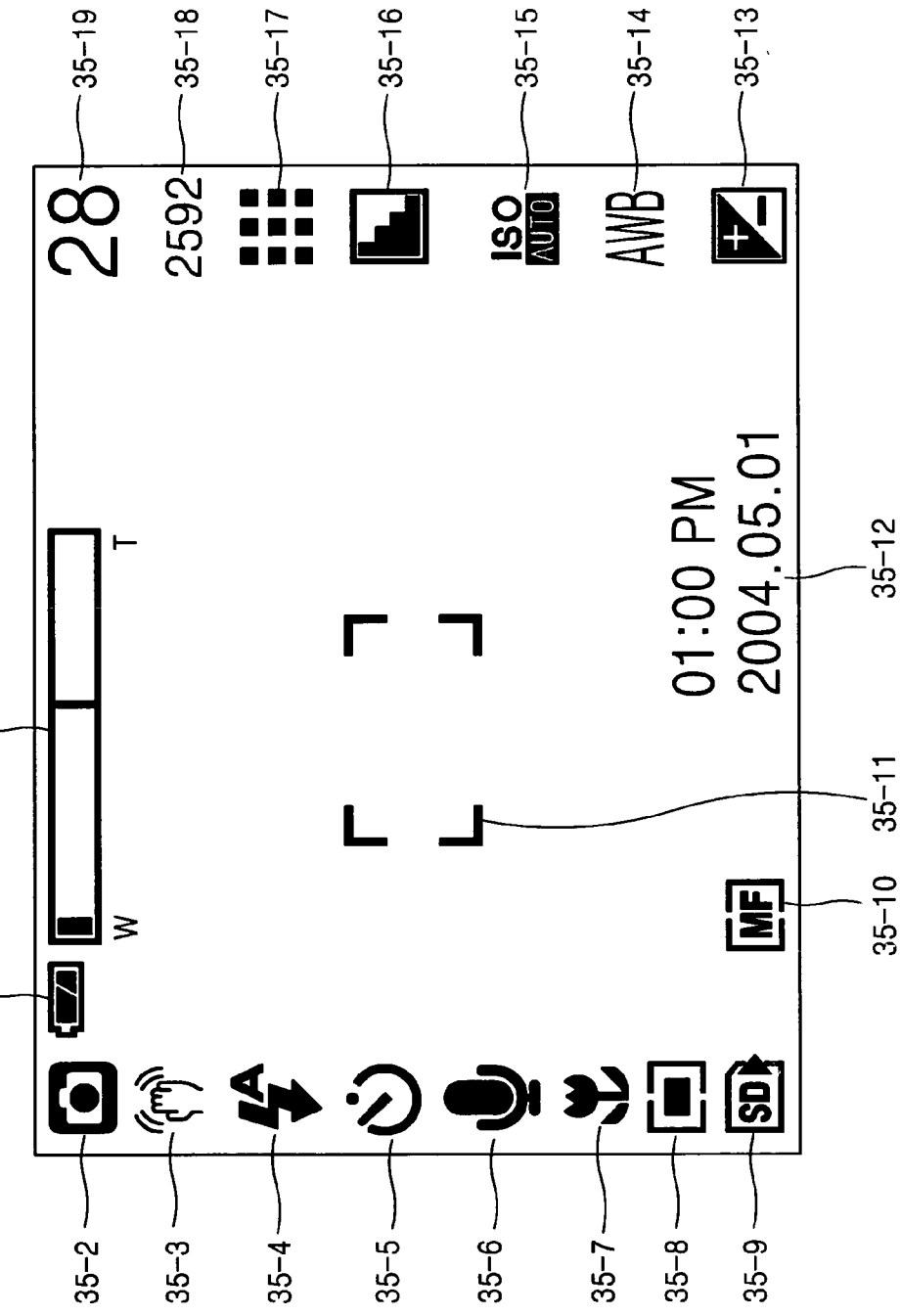
FIG. 6 illustrates an embodiment of a touch screen on which shooting information icons are displayed.

FIG. 5 is a flowchart illustrating operations of a method for operating a digital camera using a touch screen according to a first embodiment of the present invention. FIG. 6 is a view illustrating one embodiment of a touch screen on which shooting information icons are displayed for a detailed explanation of the method for operating the digital camera of FIG. 5. FIGS. 7A through 7J are views illustrating a touch screen illustrating in detail the method for operating the digital camera of FIG. 5.

First, a user presses the menu/OK button 38 in order to display the shooting information of the digital camera (operation 500).

When the menu/OK button 38 is pressed, shooting information icons are displayed on the touch screen 35 as illustrated in FIG. 6 (operation 502). The shooting icons displayed in an embodiment of the present invention will now be described in detail with reference to FIG. 6.

A battery icon, such as (35-1), represents a battery state of the digital camera, represents that a battery of the digital camera is in a full state. In an embodiment, as the battery charge is depleted the representative icon will change. For example, the icon may change from (35-1) to (Half state) and then finally to (Empty state).

An icon representing one of a plurality of shooting modes may be displayed on the touch screen 35. For example, an auto shooting mode icon such as (35-2) may be displayed. A hand-shake warning icon such as (35-3), is displayed in cases where shooting is performed under dark circumstances or shooting is performed without the flash firing. If the hand-shake warning icon is displayed, shooting should be performed using a tripod (not shown) or the flash should be activated.

An auto-flash mode icon such as (35-4) is displayed when an auto-flash mode is currently set among a plurality of flash modes. The plurality of flash modes will be described below.

When a self-timer icon, such as (35-5), is active, the camera displays a countdown timer on the touch screen 35. The countdown timer counts a time until a signal associated with a user pressing the shutter button 13 is automatically generated. The self-timer icon can be repeatedly pressed until a desired time is displayed on the touch screen 35.

Selecting a voice memo display icon, such as (35-6), will allow the user to record a voice memo in a stored image. A macro icon, such as (35-7), is used when a close shot within a shooting range of approximately 4-80 cm is performed. A multi-division metering icon, such as (35-8), may be chosen from among metering icons for changing a metering type to photograph a bright image when an appropriate exposure is not secured. The multi-division icon divides a screen into a plurality of parts and performs an operation mainly for a central portion on the basis of brightness information of each part, thereby determining a brightness of the screen on the whole.

An icon representing a storage medium type of the digital camera may be displayed on the touch screen 25. For example, a secure digital (SD) card icon such as (35-9) is displayed to indicate that a memory card mounted in the digital camera is a secure digital (SD) card. As another example, a memory stick duo icon such as (not shown) is displayed on the touch screen 35 when a memory card mounted in the digital camera is a memory stick duo.

Icons related to lens focusing are displayed on the touch screen 35. Among the icons for adjusting a focus is a manual focus adjustment icon such as (35-10). The camera also displays an auto-focus mark such as (35-11) to highlight on the touch screen 35 an image to be captured. In an embodiment, if the image is focused, the color of the auto-focus mark is changed from red to green. Additionally, the current date and time may be represented by a mark such as 01:00 PM 2004. 05. 01 (35-12).

If an exposure-correction icon such as (35-13) is displayed on the touch screen 35, an exposure amount appropriate for a shooting circumstance is automatically controlled. An automatic white balance icon such as AWB (35-14) represents a mode wherein the camera achieves an optimum white balance by automatically selecting from among white balance icons under which a natural color of an image can be reproduced depending on a light source. Other icons associated with a white balance will be described below.

An icon associated with a shooting sensitivity is also displayed on the touch screen 35. For example, an automatic shooting sensitivity icon such as (35-15) is displayed when the shooting sensitivity is automatically controlled depending on a light condition and a brightness of an object. Other icons associated with a shooting sensitivity will be described below.

An icon associated with image sharpness is displayed on the touch screen 35. Among sharpness icons for controlling a sharpness of an image to shoot, a sharp-edge image icon such as (35-16) is a sharpness icon representing that an edge of an image is expressed sharply and that an image photographed under that icon is appropriate for printing. Other icons associated with a sharpness will be described below.

An icon associated with image quality is also displayed on the touch screen 35. As described below, a user may choose an icon from among image quality icons to selecting an appropriate compression rate depending on a use or purpose of a photographed image an ultra-high quality icon. For example, the user may choose an ultra-high image quality icon such as (35-17) in order to capture ultra-high quality images in a still image mode. Other icons associated with the image quality will be described below.

An icon representing an image size may be displayed on the touch screen 35. A user may select among resolution icons to select an image size which is appropriate for the purpose of an image to be photographed. For example, in FIG. 6, 2592 (35-18) is an icon representing a resolution of 2592×1944. Other icons associated with a resolution will be described below.

The digital camera may display an icon representing a remaining number of images that may be captured and stored on the storage medium. For example, in FIG. 3, the icon 28 (35-19) informs the user that he or she may take 28 more still photographs.

An optical/digital zoom icon such as (35-20) is displayed on the touch screen 35. The left edge of the optical/digital zoom icon represents a widened view of the image and is labeled with a "W." The right edge of the optical/digital zoom icon represents a tightened/enlarged view of the image and is labeled with a "T." Thus, as a cursor moves towards the W on the left in the optical/digital zoom icon, an image appears smaller. In contrast, as a cursor moves toward the "T" on the right side of the optical/digital zoom icon, an image appears larger.

When the digital camera is in operation, an operating mode of the digital camera can be changed by touching a corresponding icon from among the icons displayed on the touch screen 35 (operation 504). Touching an icon on the touch screen 35 causes the digital camera to display menu icons that correspond to the touched icon (operation 506). After that, if a desired menu icon is touched among the displayed menu icons (operation 508), a corresponding function is performed (operation 510). At this point, a relevant change value, i.e. an alternate mode of operation which corresponds to a selected menu icon, may be set for the function corresponding to the selected menu icon. The change values are displayed on the touch screen 35 and the relevant change value can be set by touching the relevant change value on the touch screen or pressing buttons provided to the camera.

Figure 7A:
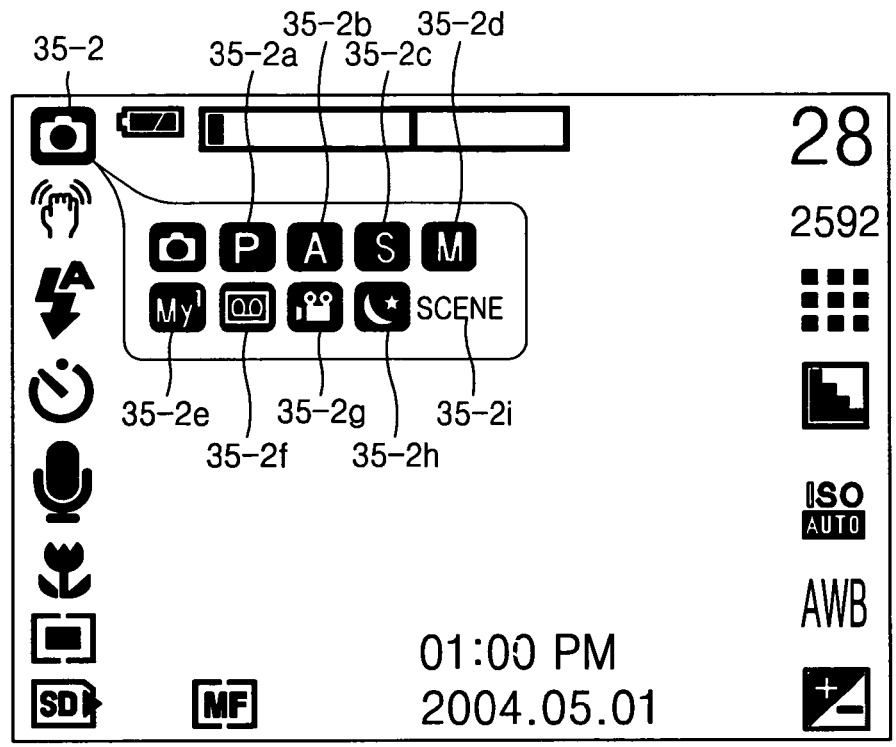
FIGS. 7A through 7J are views illustrating a touch screen explaining in detail the method for operating the digital camera of FIG. 5.

The operations 504 through 510 will be described in detail with reference to FIGS. 6 and 7A through 7J. If the auto shooting mode icon (35-2) displayed on the touch screen 35 is touched, a plurality of icons that correspond to the shooting modes are displayed as illustrated in FIG. 7A. The camera can be changed into a relevant shooting mode by touching a desired icon among the displayed shooting mode icons.

FIG. 7A illustrates a plurality of general shooting modes which are available to the user. The auto shooting mode icon (35-2) selects a mode that minimizes user settings for taking a shot in a fast and simple manner. A program mode icon such as (35-2*a*) represents a mode in which the camera suggests an optimum setting in an auto mode and allows a user to manually set a variety of functions except an aperture (MA) and a shutter speed to take a shot. A user may touch an aperture priority mode icon such as (35-2*b*) to select a mode in which the MA can be set in person by a user and shooting is performed. The shutter speed may be manually set for shooting, when the user touches shutter priority mode icon such as (35-2*c*). Additionally, the user may choose to enter a manual mode by touching a manual mode icon such as (35-2*d*). The user may set and store frequently used shooting conditions so that the shooting conditions can be easily loaded and used later by selecting a Myset mode icon such as (35-2*e*). A voice recording mode icon such as (35-2*f*) may be selected to set a voice recording mode icon for recording only a voice for a time allowed by a memory card storage space. A user may also select a moving image mode icon such as (35-2*g*) for shooting and storing a moving image for a time allowed by a memory card storage space. A night scene mode icon such as (35-2*h*) is provided for shooting which is performed at night or dark circumstances. A user may touch a scene mode icon such as SCENE (35-2*i*) to select a mode in which an optimum camera setting can be simply performed through a menu depending on shooting circumstances such as a figure, dawn, seaside, winter landscape, or an object's state.

Figure 7B:
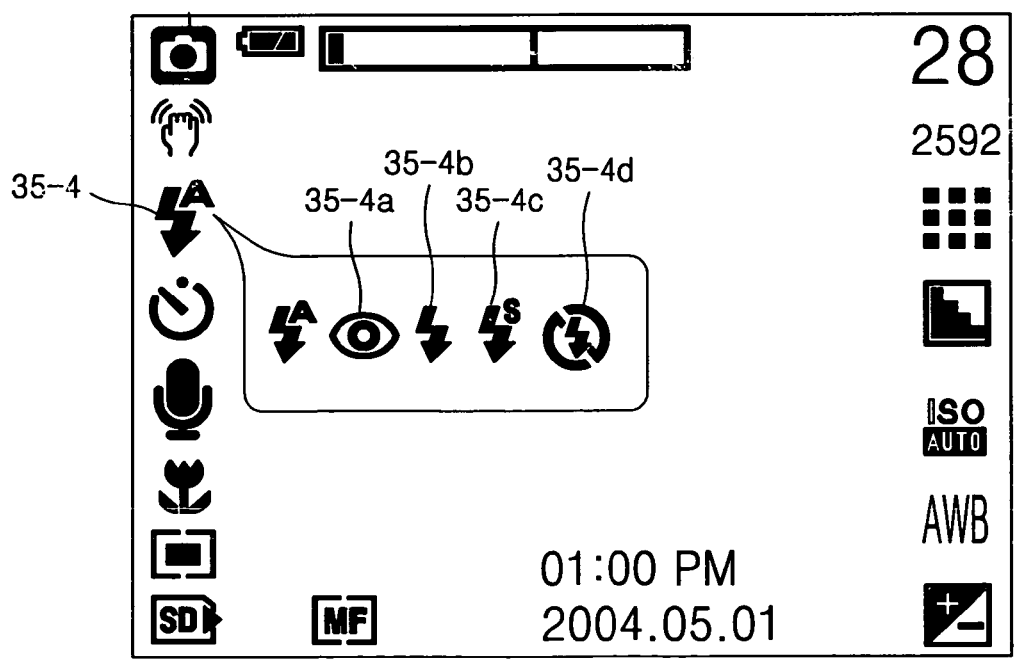

The plurality of flash modes will now be discussed. If the auto-flash mode icon (35-2) is touched on the touch screen 35 of FIG. 6, a plurality of icons that correspond to flash modes are displayed as illustrated in FIG. 7B. If a desired icon is touched from among the displayed flash mode icons, a flash mode of the camera can be changed. An auto & red eye reduction flash mode icon such as (35-4*a*) may be touched to select a mode under which the flash 12 of the camera automatically operates when an object or a background is dark and performs a preflash firing so that a red-eye phenomenon may be reduced. Touching a forced-flash firing mode icon such as (35-4*b*) sets a mode under which the flash 12 always operates regardless of the brightness of an object to shoot or a background but an amount of light emitted from the flash is automatically controlled depending on a brightness of a neighborhood. A slow-synchro flash mode icon such as (35-4*c*) may be used to select a mode under which the flash 12 fires while a shutter operates in a low speed upon shooting over a dark background in the evening so that both an object to shoot and the background are shot brightly. Touching a flash-firing prohibition mode icon such as (35-4*d*) sets a mode under which the flash 12 does not operate and thus is used in a place where flash shooting is prohibited.

Figure 7C:
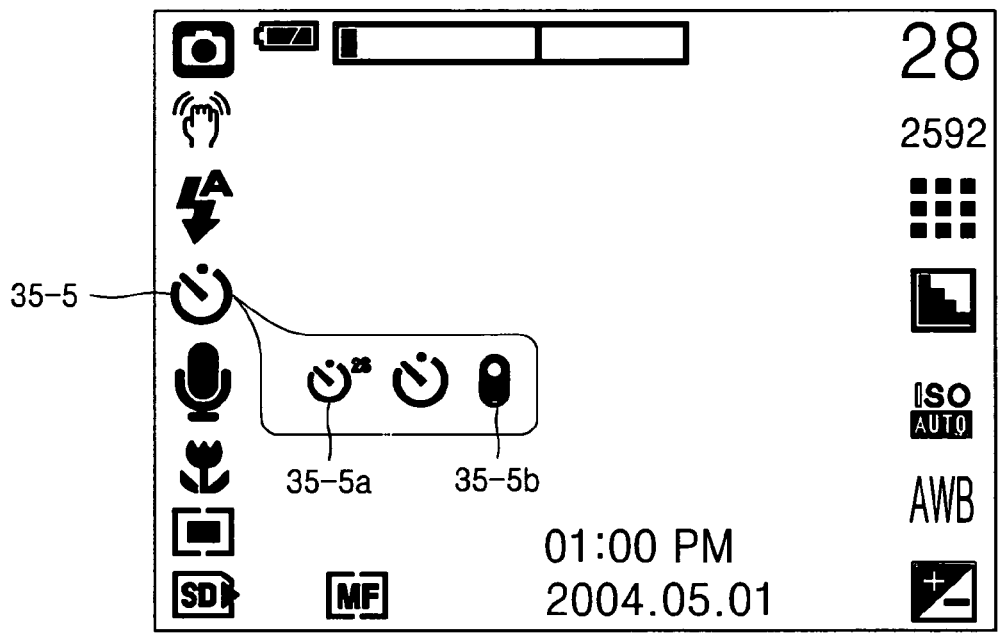

A plurality of timer mode icons will now be discussed. If the self-timer mode icon ☺(35-5) on the touch screen 35 is touched to change a timer mode selection, a plurality of icons that correspond to the timer mode are displayed as illustrated in FIG. 7C. If a desired icon is touched among the displayed timer mode icons, the timer mode of the camera can be changed.

When the self-timer mode icon ☺(35-5) is selected, the counter shows a time until a signal corresponding to the pressing of the shutter button 13 is automatically generated. The self-timer mode icon ☺(35-5) can be repeatedly pressed until a desired countdown time is displayed on the touch screen 35. For example, ☺(35-5*a*) illustrates the appearance of the self-timer mode icon when the self timer mode icon (35-5) is pressed one time. In that case, if the shutter button 13 is pressed, shooting is performed after about two seconds. A user may also select a remote control icon such as ☺(35-5*b*) to set a mode in which shooting can be performed using a remote control (not shown) without using the timer mode.

Figure 7D:
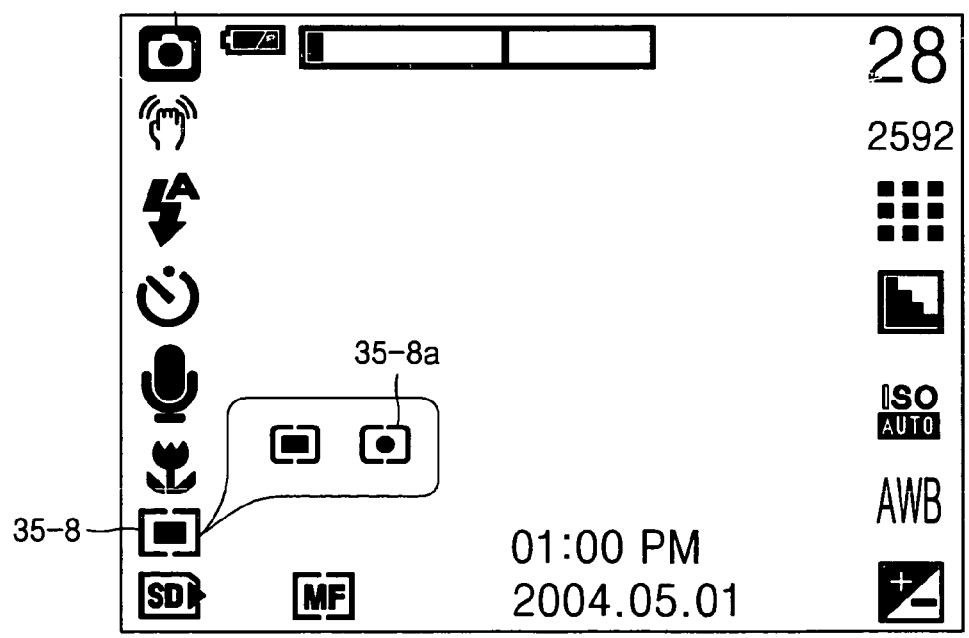

If the multi-division metering icon ▥(35-8) is touched on the touch screen 35 to change a metering mode, icons that correspond to metering modes are displayed as illustrated in FIG. 7D. If a desired icon is touched among the displayed metering mode icons, a metering mode of the camera can be changed. The metering mode is a mode intended for shooting an image brightly by changing a metering mode when an appropriate exposure cannot be secured.

Touching the multi-division metering mode icon ▥(35-8) divides a screen into a plurality of parts and performs an operation mainly for a central portion thereof on the basis of brightness information of each part, thereby determining a brightness of the screen on the whole. The multi-division metering mode is appropriate for most cases. By touching a spot metering mode icon such as ▣(35-8*a*), a user may select a mode which meters only a region surrounded by a rectangle at the central portion of the touch screen 35. The spot metering mode is appropriate when a central object is intended to be precisely exposed regardless of a background light.

Figure 7E:
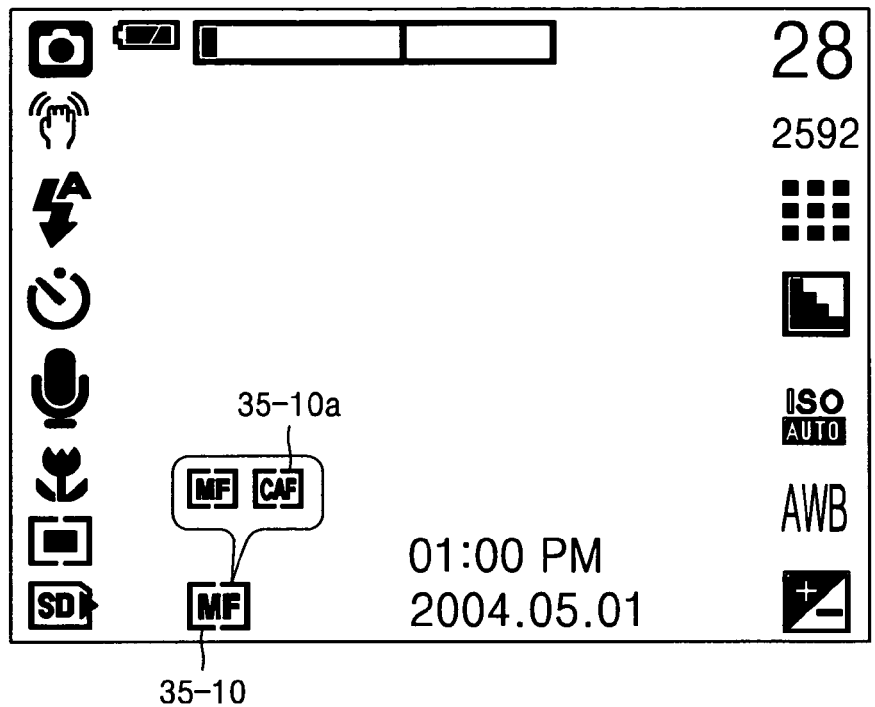

A plurality of focus modes will now be discussed. If the manual focus adjustment mode icon ▦(35-10) on the touch screen 35 is touched to change a focus mode, icons that correspond to focus modes are displayed as illustrated in FIG. 7E. If a desired icon is touched among the displayed focus mode icons, a focus mode of the camera can be changed. In FIG. 7E, ▦(35-10) is a manual focus mode icon for focusing manually. A user may also select a continuous auto-focus icon such as ▦(35-10*a*) for focusing automatically.

Figure 7F:
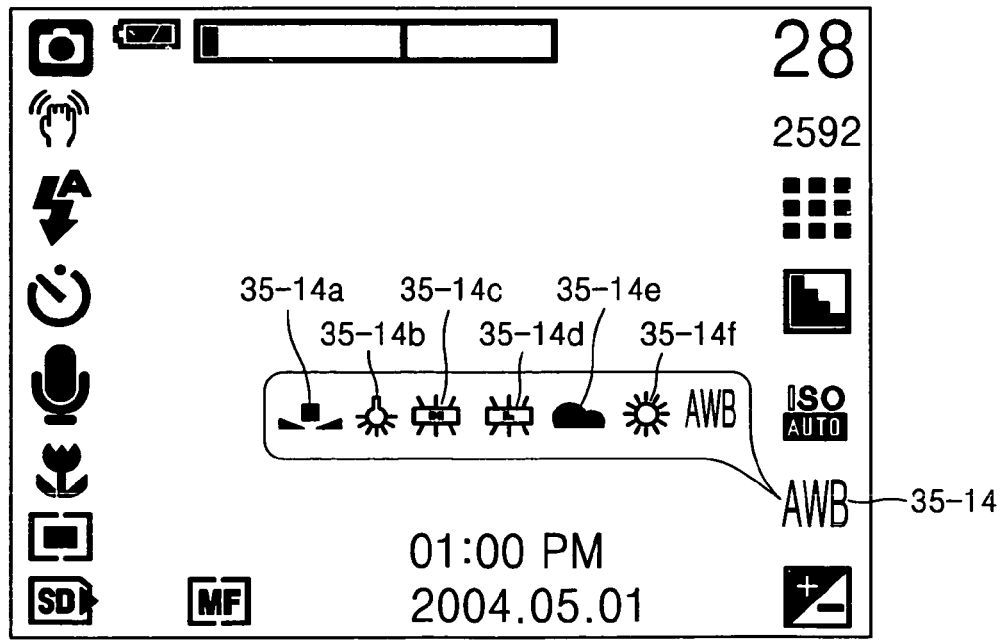

If the automatic white balance icon AWB (35-14) on the touch screen 35 is touched to change a white balance mode, icons that correspond to white balance modes are displayed as illustrated in FIG. 7F. If a desired icon is touched among the displayed white balance mode icons, a white balance mode of the camera can be changed.

In FIG. 7F, AWB (35-14) is an auto white balance mode icon, under which the camera can automatically select an optimum white balance depending on a light source. By touching a custom white balance mode icon such as ☼(35-14*a*), a user can choose a mode in which he or she can set a specific white balance depending on a shooting circumstance. An incandescent lamp white balance mode icon such as ✱(35-14*b*) may be touched to select a mode which is appropriate for an indoor shooting under light conditions such as a halogen lamp or an incandescent lamp. Touching a fluorescent lamp H white balance mode icon such as ⋈(35-14*c*) sets a mode which is appropriate for a shooting under light conditions such as a fluorescent lamp or a three-wavelength-fluorescent light of a daylight fluorescent lamp type. A fluorescent lamp L white balance mode icon ⋈(35-14*d*) may be touched to select a mode which is appropriate for a shooting under light conditions such as a variety of white fluorescent lamps. A shooting mode which is appropriate for a shooting during a cloudy day or in a place where a shadow is cast may be set by touching a cloudy white balance mode icon such as ☁(35-14*e*).

Figure 7G:
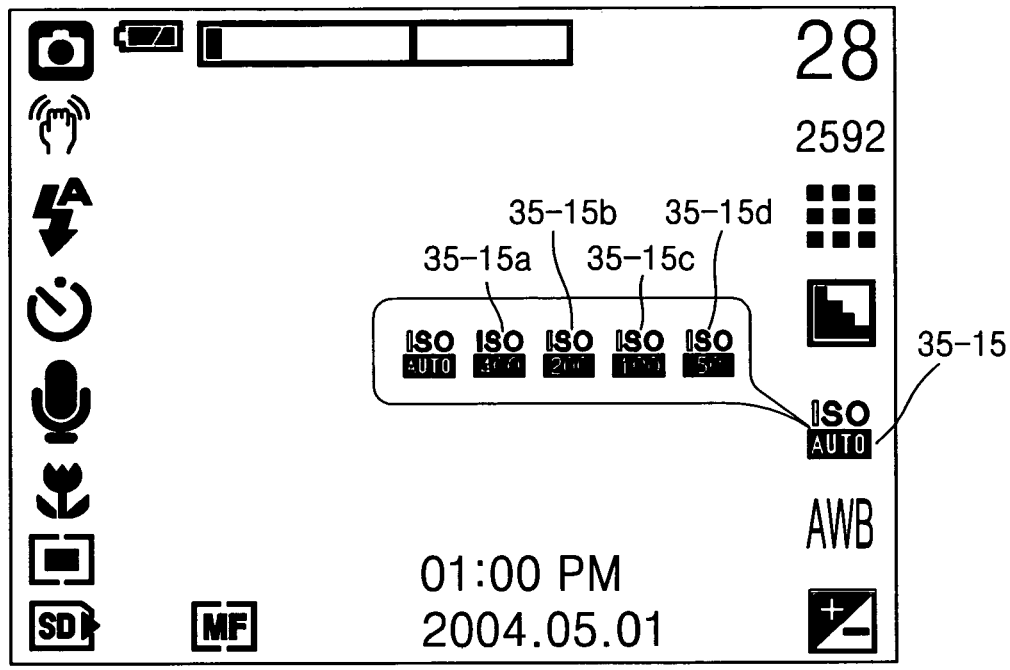

A plurality of shooting sensitivity modes will now be discussed. If the automatic shooting sensitivity icon ▪(35-15) is touched on the touch screen 35 to change a shooting sensitivity mode, icons that correspond to shooting sensitivity modes are displayed as illustrated in FIG. 7G. If a desired icon is touched among the displayed shooting sensitivity mode icons, a shooting sensitivity mode of the camera can be changed.

In FIG. 7G, ▪(35-15) is an auto-shooting sensitivity mode icon, under which shooting sensitivity is automatically adjusted depending on light conditions and a brightness of an object. The icons ▪(35-15*a*), ▪(35-15*b*), ▪(35-15*c*), and ▪(35-15*d*) also represent shooting sensitivity modes. As ISO (unit of a film sensitivity) is set higher, a faster shutter speed can be used for the same amount of light.

Figure 7H:
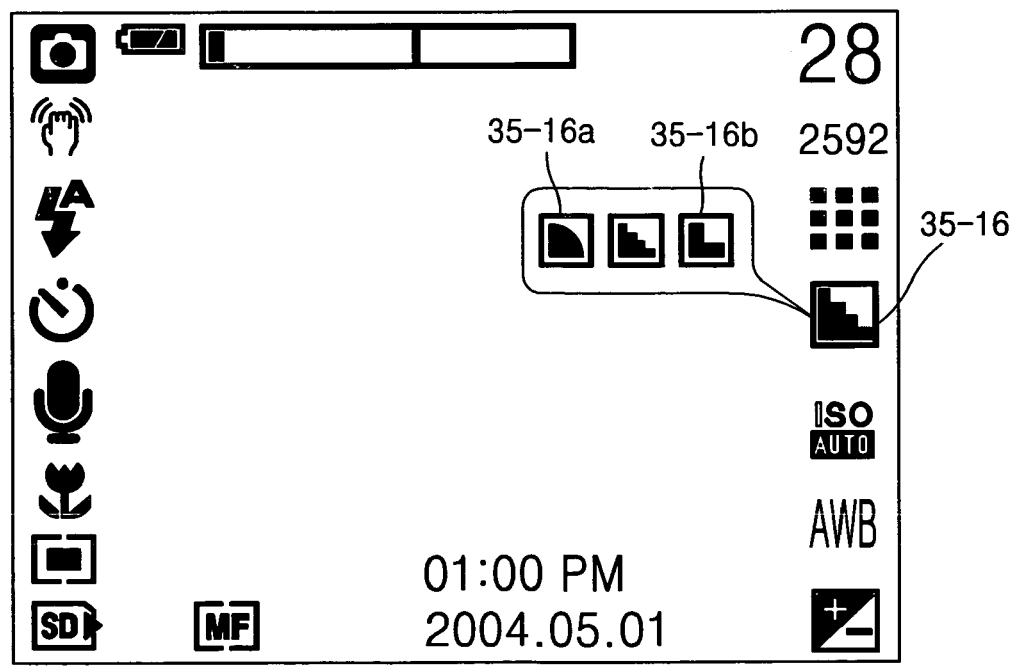

A plurality of image sharpness modes will now be discussed. If the sharp-edge image icon ◤(35-16) is touched on the touch screen 35 to change a sharpness of an image to shoot, icons that correspond to an image sharpness are displayed as illustrated in FIG. 7H. If a desired icon is touched among the displayed image sharpness icons, a sharpness of an image to shoot can be changed.

Touching the sharp-edge image icon ◤(35-16) sets a mode in which an edge of an image is reproduced sharply and is appropriate for printing. If a smooth-edge icon such as ◣(35-16*a*) is selected, an operating mode is set wherein an image is reproduced with a smooth edge and is appropriate for image editing in a computer. Touching a clear sharpness icon such as ◥(35-16*b*) sets a mode in which an edge of an image is sharp and emphasized, but a noise may be generated.

Figure 7I:
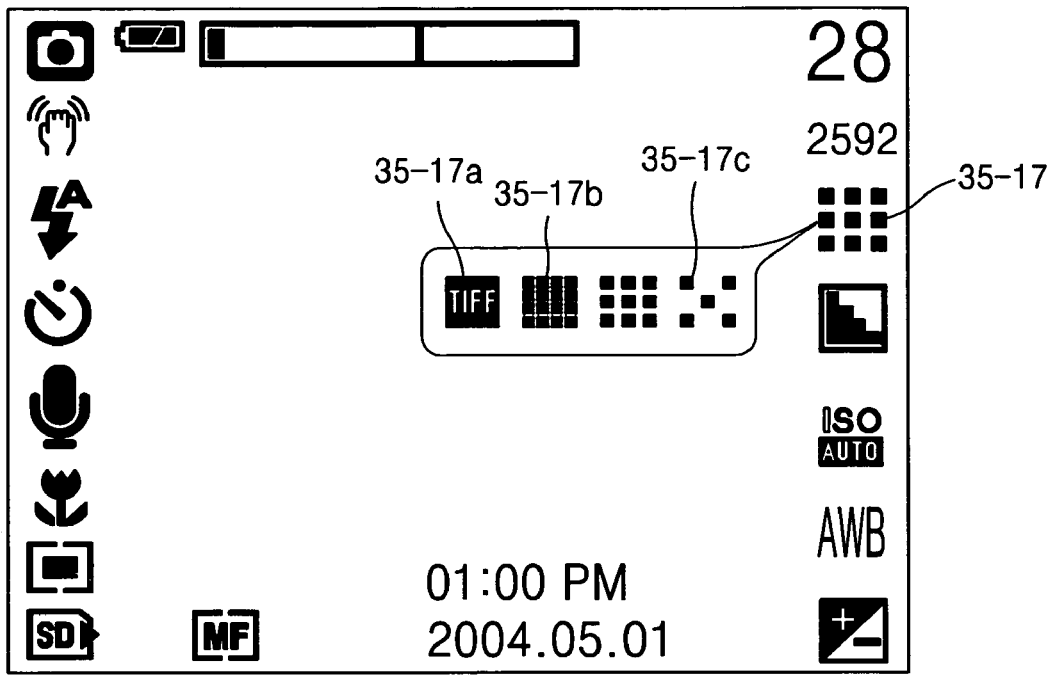

A plurality of image quality modes will now be discussed. If the ultra-high image quality icon ⋮⋮(35-17) on the touch screen 35 is touched to change an image quality mode of an image to shoot, icons that correspond to an image quality are displayed as illustrated in FIG. 7I. If a desired icon is touched among the displayed image quality icons, an image quality of an image to shoot can be changed. The image quality mode is a menu for selecting an appropriate compression rate depending on a use purpose of an image to shoot. As a compression rate gets high, an image quality is deteriorated.

In FIG. 7I, ⋮⋮(35-17) represents an ultra-high image quality in a still image mode. Touching a professional-quality mode icon such as ▪(35-17*a*) will set the digital camera to capture images in a professional-photographer appropriate mode where the most excellent image quality can be obtained, but an image size is very large. Due to the size of the image files captured in the professional-quality mode, an available number of shootings is reduced and a time consumed in storing an image in a memory card is lengthy. In FIG. 7I, ⋮⋮(35-17*b*) represents a high image quality in a still image mode and ∴represents a general image quality in a still image mode.

Figure 7J:
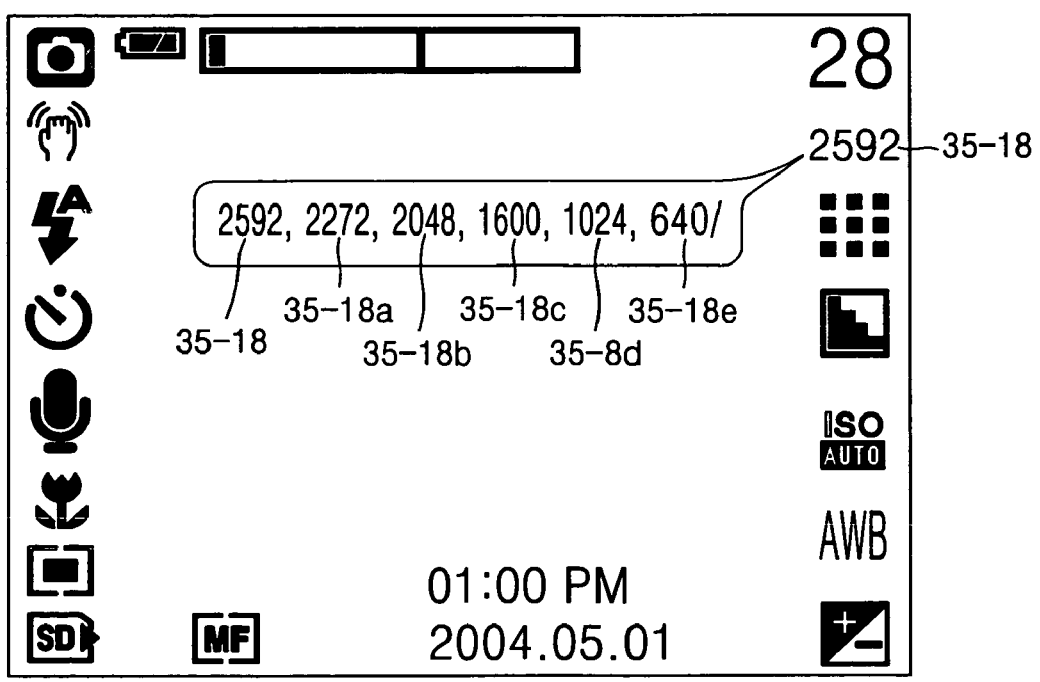

If the image size icon 2592 (35-18) on the touch screen 35 is touched to change an image size or a resolution of an image to shoot, icons that correspond to resolution modes are displayed as illustrated in FIG. 7J. If a desired icon is touched among the displayed resolution icons, an image size of an image to shoot can be changed.

In FIG. 7J, if 2592 (35-18) is selected, a resolution of an image to shoot in a still image mode is changed into 2592×1944, and if 2272 (35-18a) is selected, a resolution of an image to shoot in a still image mode is changed into 2272×1704. In addition, if 2048 (35-18b) is selected, a resolution of an image to shoot in a still image mode is changed into 2048×1536, and if 1600 (35-18c) is selected, a resolution of an image to shoot in a still image mode is changed into 1600×1200. Finally, if 1024 (35-18d) is selected, a resolution of an image to shoot in a still image mode is changed into 1024×768, and if 640 (35-18e) is selected, a resolution of an image to shoot in a still image mode is changed into 640×480.

Figure 8A:
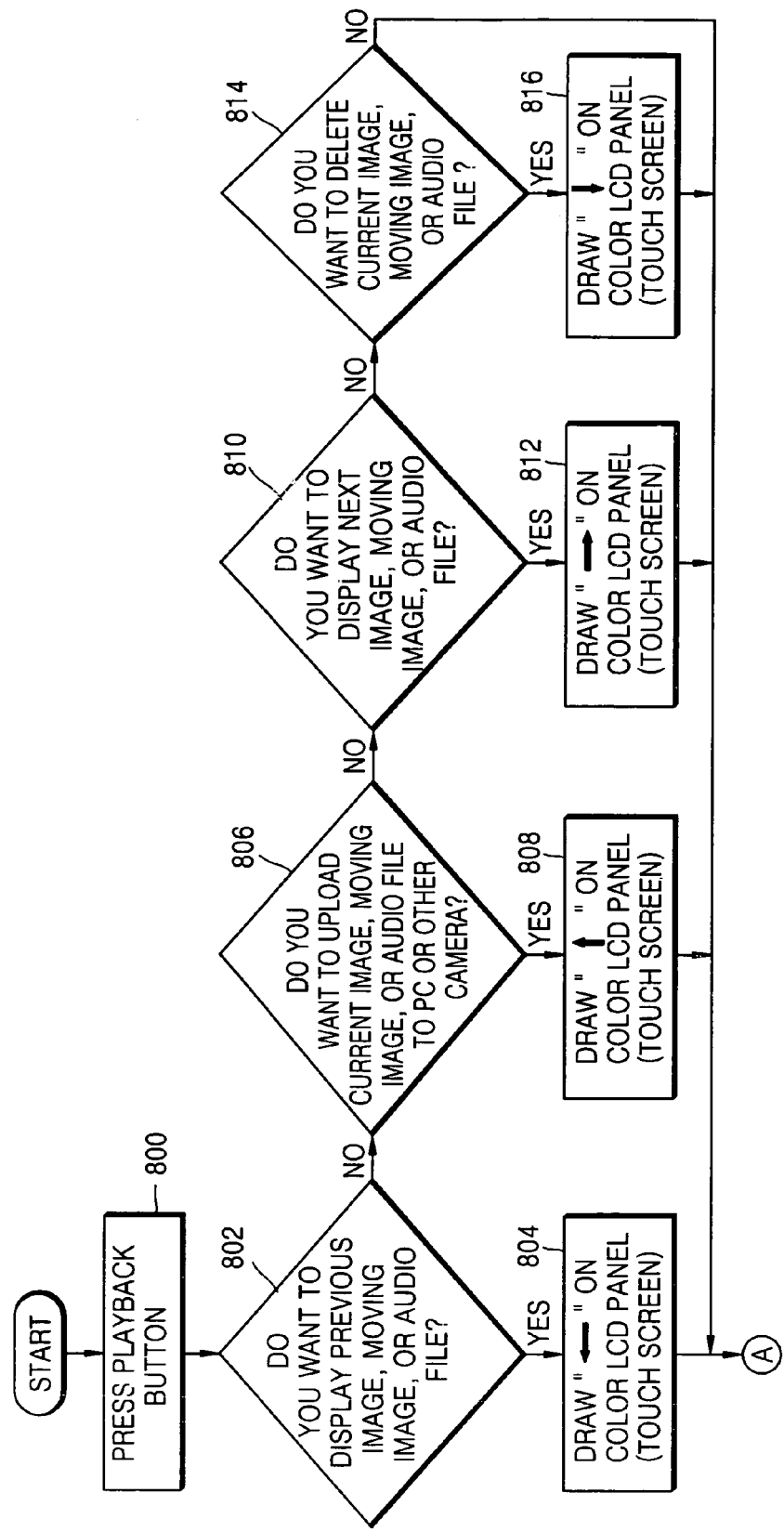
FIGS. 8A and 8B are flowcharts illustrating operations of a method for operating a digital camera using a touch screen according to a second embodiment of the present invention.
Figure 8B:
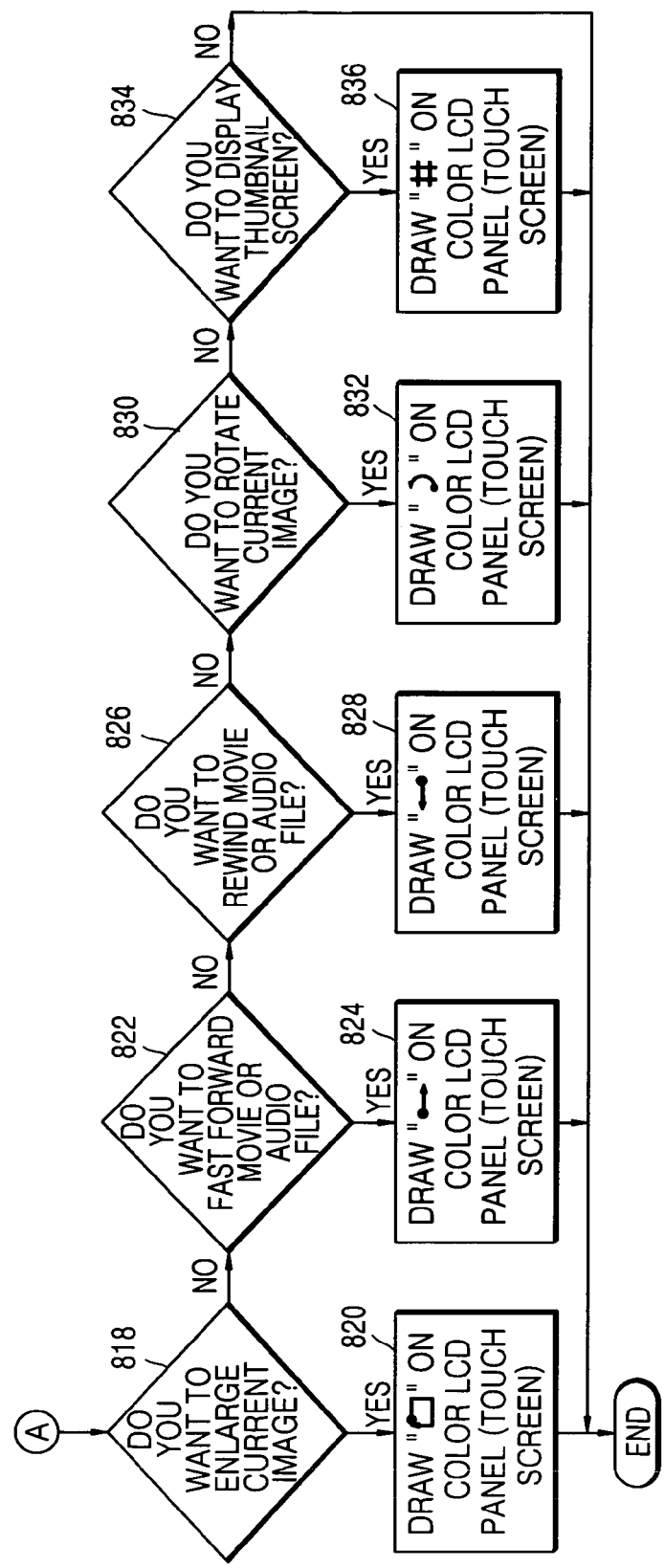

FIGS. 8A and 8B are flowcharts illustrating operations of a method for operating a digital camera using a touch screen according to a second embodiment of the present invention. FIGS. 9A through 9F are views showing a touch screen illustrating in detail the method for operating the digital camera of FIGS. 8A and 8B.

First, a user presses a playback button 44 (see FIG. 2) in order to review and operate a still image, a moving image shot last, or voice information captured last (operation 800). If the playback button 44 is pressed, an image, a previously shot moving image, or a previously captured voice file is displayed on a touch screen 35 (see FIG. 2).

A program for operating the camera using the touch screen 35 is stored in an EEPROM 505 (see FIG. 4) so that a relevant function is performed if predetermined touch screen data is input. If a user draws a predetermined figure on the touch screen 35, a touch screen detection unit 515 (see FIG. 4) detects the drawing of a user and outputs the drawing to a micro-controller 512 (see FIG. 4). The micro-controller 512 controls to perform a relevant function that corresponds to the predetermined figure input using the program stored in the EEPROM 505.

Figure 9A:
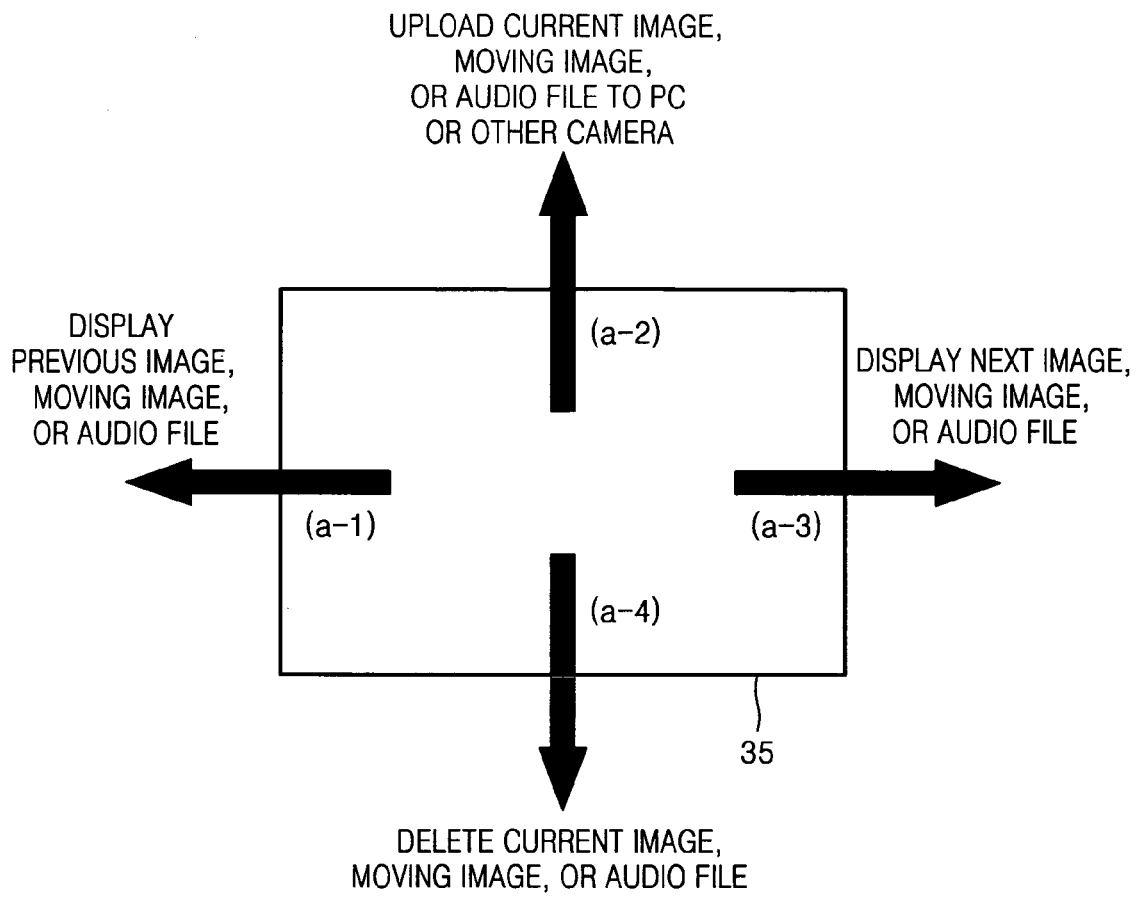
FIGS. 9A through 9F are views illustrating a touch screen explaining in detail the method for operating the digital camera of FIG. 8.

To display a next image or file in a reverse direction from the image or file currently displayed on the touch screen 35 (operation 802), a left region a-1 from the center on the touch screen 35 should be touched or a reverse symbol, e.g. "←," should be drawn on the region a-1 as illustrated in FIG. 9A (operation 804).

To upload an image or file currently displayed on the touch screen 35 to a PC (not shown) or other digital camera (not shown) (operation 806), an upward region a-2 from the center on the touch screen 35 should be touched or an upload symbol, e.g. "↑," should be drawn on the region a-2 as illustrated in FIG. 9A (operation 808).

To display a next image or file in the forward direction from the image or file currently displayed on the touch screen 35 (operation 810), a right region a-3 from the center on the touch screen 35 should be touched or a forward symbol, e.g. "→," should be drawn on the region a-3 as illustrated in FIG. 9A (operation 812).

To delete an image or file currently displayed on the touch screen 35 (operation 814), a downward region a-4 from the center on the touch screen 35 should be touched or a delete symbol, e.g. "↓," should be drawn on the region a-4 as illustrated in FIG. 9A (operation 816).

Figure 9B:
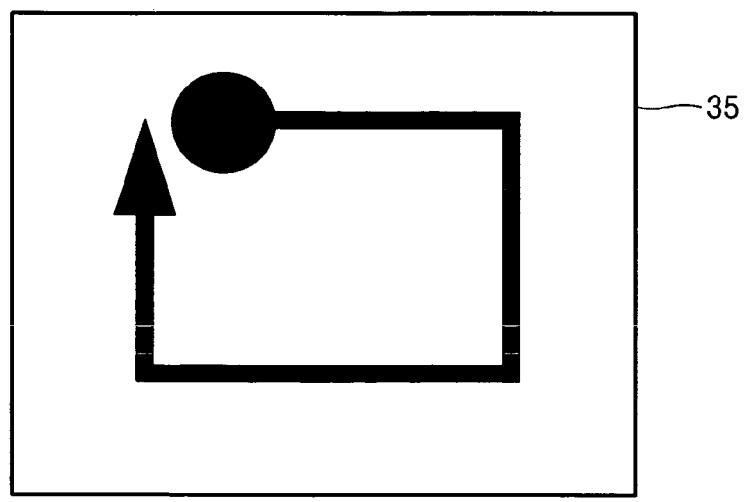

To enlarge an image currently displayed on the touch screen 35 (operation 818), an enlargement symbol, e.g. ▢, should be drawn on the touch screen 35 as illustrated in FIG. 9B (operation 820). To enlarge the enlarged image even more, the enlargement symbol ▢ should be repeatedly drawn.

Figure 9C:
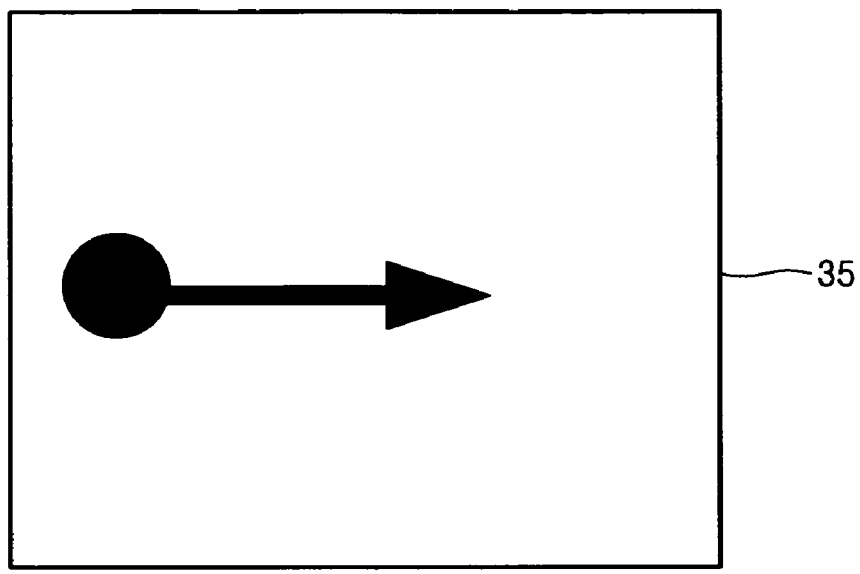

To perform a fast-forward (F/F) operation in a moving image file or an audio file currently displayed on the touch screen 35 (operation 822), a fast-forward symbol, e.g. ↠, should be drawn on the touch screen 35 as illustrated in FIG. 9C (operation 824).

Figure 9D:
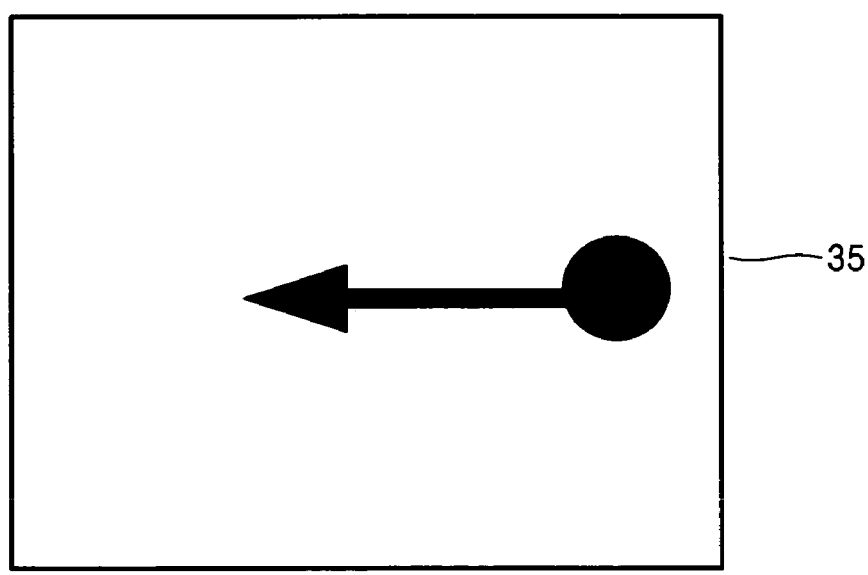

To rewind (R/W) a moving image file or an audio file currently displayed on the touch screen 35 (operation 826), a rewind symbol, e.g. ↞, should be drawn on the touch screen 35 as illustrated in FIG. 9D (operation 828).

Figure 9E:
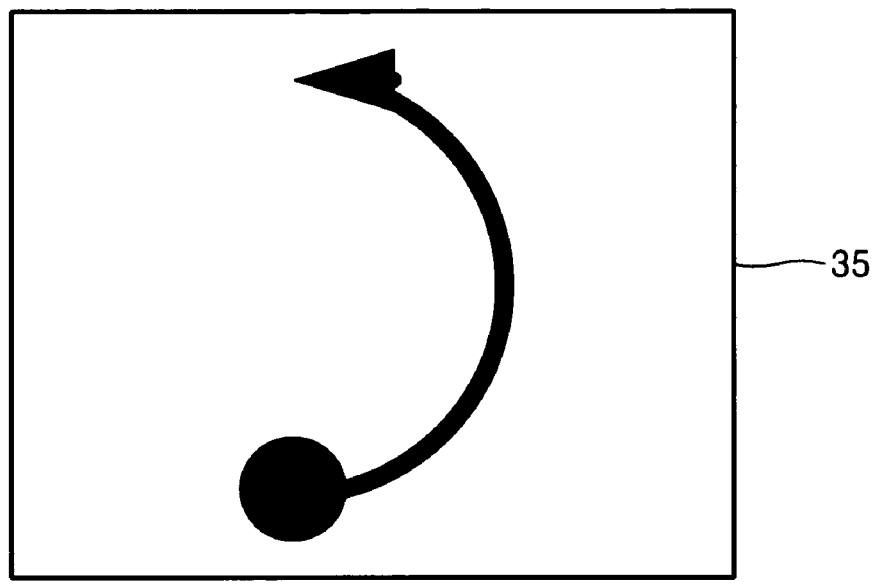

To rotate an image currently displayed on the touch screen 35 (operation 830), a rotation symbol, e.g. ↻, should be drawn on the touch screen 35 (operation 832) as illustrated in FIG. 9E. If the rotation symbol ↻ is drawn again on the touch screen 35 after an image has been already rotated and displayed, the image is rotated and displayed again.

Figure 9F:
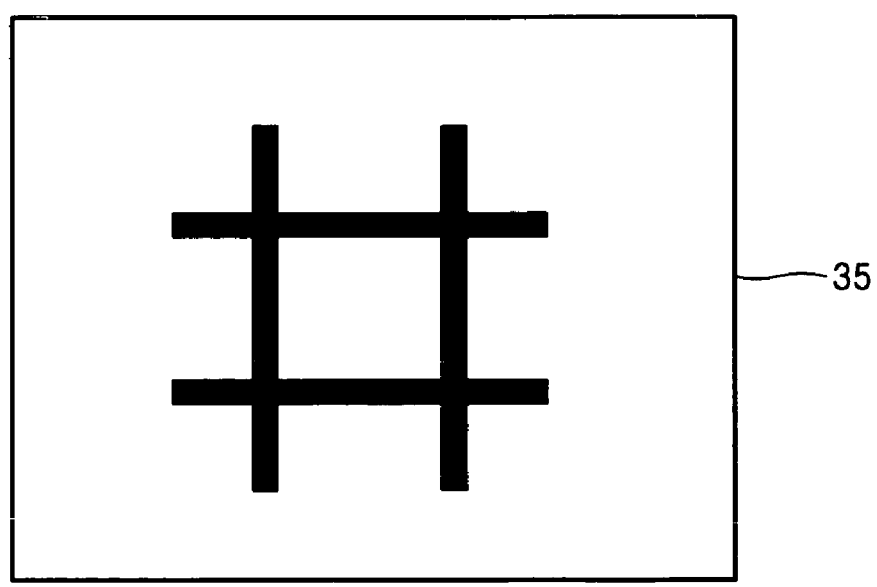

To display a plurality of images on the touch screen 35 at the same time in the form of thumbnail images (operation 834), a thumbnail image symbol, e.g. ⋕, should be drawn on the touch screen 35 (operation 836) as illustrated in FIG. 9F, so that a plurality of images, i.e., thumbnail images, are displayed at the same time on the touch screen 35.

As described above, according to an embodiment of the present invention, shooting information of the camera can be simply changed by operating only those icons displayed on the touch screen and a unique camera operating method is provided on the touch screen, whereby a user can change and operate shooting information and images in a convenient manner.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating a photographing apparatus having a touch screen, the method comprising:
   receiving input image data from an optical system of the digital camera, the input image data representing a subject to be photographed by the digital camera;
   detecting when a user has pressed a button;
   in response to detecting when a button has been pressed, retrieving from a memory of the digital camera a file containing an image, moving image, or audio file;
   displaying a retrieved file on a display, wherein the display is a touch screen;
   detecting that a user has drawn a symbol on the touch screen by touching and moving across the touch screen so as to create the symbol; and
   performing on the retrieved file an operation represented by the drawn symbol.

2. The method of claim 1, wherein
   the symbol represents a reverse direction; and
   the operation performed is to cease displaying the retrieved file and to display an image of a next file in a reverse direction.

3. The method of claim 1, wherein
   the symbol represents a forward direction; and
   the operation performed is to cease displaying the retrieved file and to display an image of a next file in a forward direction.

4. The method of claim 1, wherein
   the symbol represents an uploading function; and
   the operation performed is to upload the retrieved file to a storage medium of another device.

5. The method of claim 1, wherein
   the symbol represents a deletion function; and the operation performed is to delete the retrieved file from a memory of the photographing apparatus.

6. The method of claim 1, wherein the operation comprises altering the display of the retrieved file.

7. The method of claim 1, wherein the operation comprises altering the display of a moving image file such that a non-adjacent segment of the moving image file is displayed.

8. The method of claim 1, wherein
the symbol represents a thumbnail display function; and
the operation performed is to display a plurality of images simultaneously on the touch screen.

9. A digital photographing apparatus, the apparatus comprising:
an optical system that receives light from a subject to be photographed by the apparatus;
a digital processor that receives signals representing the light received by the optical system and converts the signals into an image;
a memory that stores the image;
a touch screen that displays the image stored in the memory;
a detector that detects a user-drawn symbol that is drawn on the touch screen by touching and moving across the touch screen so as to create the symbol; and
a processing element that performs an operation on the displayed image represented by the user-drawn symbol.

10. The apparatus of claim 9, wherein the digital processor further converts the received signals into a moving image that is stored in the memory, the moving image being displayed on the touch screen, and an operation that is represented by the user-drawn symbol being performed on the moving image.

11. The apparatus of claim 9, further comprising:
a microphone that receives audio signals presented at the apparatus;
a memory for storing an audio data file containing a representation of the audio signals; and
a speaker for presenting the stored audio data file;
wherein
the processing circuitry further performs an operation on the audio data file represented by the user-drawn symbol.

12. The apparatus of claim 9, wherein the detector detects a two-dimensional user-drawn symbol that is drawn on the touch screen.

13. A method for operating a photographing apparatus having a touch screen, the method comprising:
receiving input image data from an optical system of the digital camera, the input image data representing a subject to be photographed by the digital camera;
detecting when a user has pressed a button;
in response to detecting when a button has been pressed, retrieving from a memory of the digital camera a file containing an image, moving image, or audio file;
displaying a retrieved file on a display, wherein the display is a touch screen;
detecting that a user has drawn a two-dimensional symbol on the touch screen by touching and moving across the touch screen so as to create the symbol; and
performing a camera operation represented by the drawn two-dimensional symbol.

14. The method of claim 13, wherein the camera operation is an operation on the image file that is displayed on the touch screen.

15. The method of claim 14, wherein the two-dimensional symbol relates to an operation selected from the group consisting of: a zoom-in or zoom-out or enlargement or reduction operation of a displayed image, a thumbnail operation, and an image rotation operation of a displayed image.

16. The method of claim 13, wherein the two-dimensional symbol is selected from the group consisting of: a rectangular or circular symbol, an arc symbol, and a pound-sign symbol.

* * * * *